United States Patent
Shinkle

[15] 3,691,925
[45] *Sept. 19, 1972

[54] CAMERA HAND GRIP

[72] Inventor: Jackson J. Shinkle, 1904 No. Geyer Rd., St. Louis, Mo. 63131

[ * ] Notice: The portion of the term of this patent subsequent to Aug. 31, 1988, has been disclaimed.

[22] Filed: June 15, 1970

[21] Appl. No.: 46,276

Related U.S. Application Data

[63] Continuation-in-part of Ser. No. 743,826, July 10, 1968, Pat. No. 3,602,123.

[52] U.S. Cl. .................................................... 95/86
[51] Int. Cl. ............................................ G03b 17/56
[58] Field of Search .................. 95/86; 352/197, 243

[56] References Cited

UNITED STATES PATENTS

| | | |
|---|---|---|
| 2,793,573 | 5/1957 | Cuchet ....................... 95/86 X |
| 2,942,537 | 6/1960 | Zimmerman .............. 95/86 X |
| 2,949,838 | 8/1960 | Skalabrin ....................... 95/86 |
| 2,961,937 | 11/1960 | Karpf ............................. 95/86 |
| 2,140,051 | 12/1938 | Hart ............................... 95/86 |
| 1,621,903 | 3/1927 | Rossiter ...................... 95/86 X |
| 2,261,953 | 11/1941 | Brown ......................... 95/11.5 |
| 2,270,707 | 1/1942 | Humski ...................... 33/47 X |
| 2,109,993 | 3/1938 | Furst ........................... 33/47 X |
| 3,408,911 | 11/1968 | Ramos ........................... 95/86 |

FOREIGN PATENTS OR APPLICATIONS

| | | | |
|---|---|---|---|
| 1,052,804 | 3/1959 | Germany | ...................... 95/86 |

Primary Examiner—Samuel S. Matthews
Assistant Examiner—Richard M. Sheer
Attorney—Rogers, Ezell, Eilers and Robbins

[57] ABSTRACT

A hand grip for a camera. The hand grip has an index finger guide for aiming of the camera in the direction the index finger is pointing and has a thumb operated shutter release oriented for actuation using muscles of the thumb that have minimal effect on the index finger.

3 Claims, 7 Drawing Figures

PATENTED SEP 19 1972 3,691,925
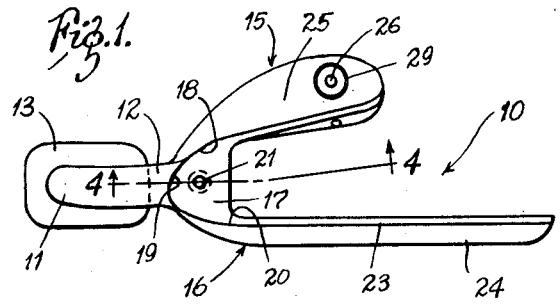
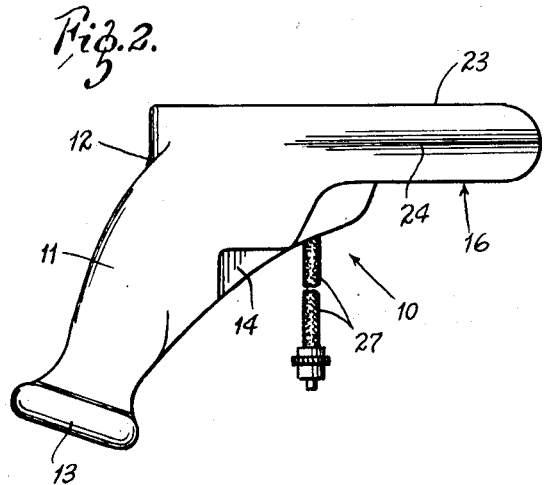
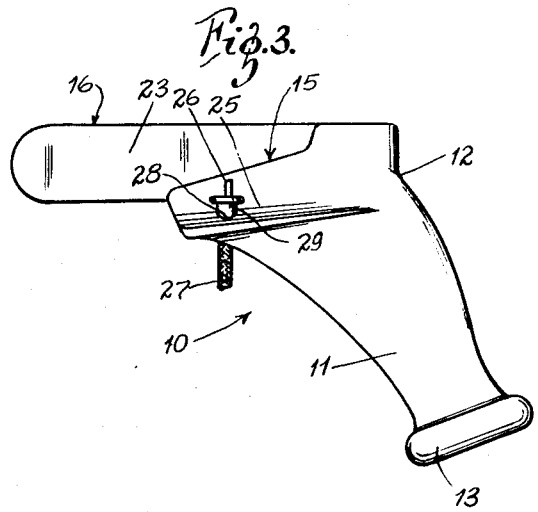
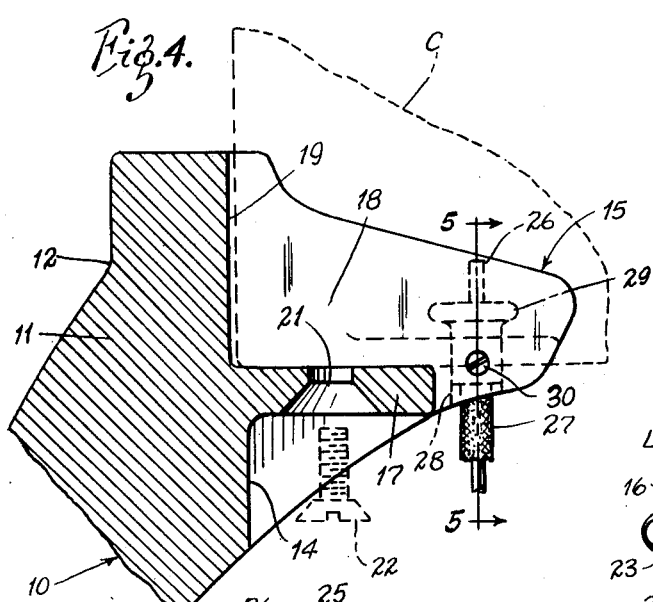
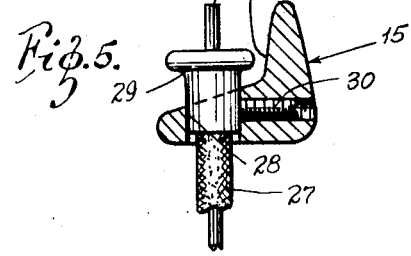
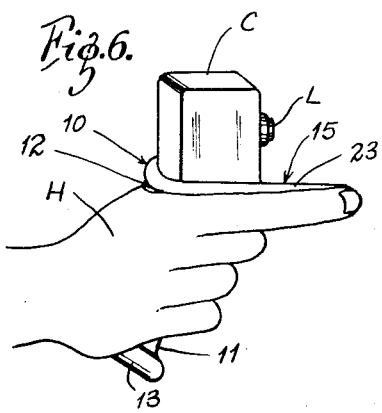
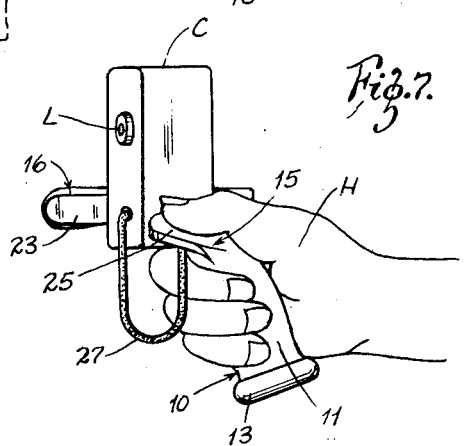
INVENTOR:
JACKSON J. SHINKLE,
By Rogers, Ezell, Eilers & Robbins
ATTORNEYS

CAMERA HAND GRIP

BRIEF DESCRIPTION OF THE INVENTION

This application is a continuation-in-part of application Ser. No. 743,826 filed July 10, 1968 now U.S. Pat. No. 3,602,123, granted Aug. 31, 1971.

The hand grip of this invention preferably is in the form of a pistol grip. It may be made or cast separately with a suitable locking attachment to a camera, or it may be made or cast as an integral part of the body of the camera so that camera and grip are unitary and non-detachable.

The grip is generally sized to be held by the thumb and all but the index finger of a hand. There is a special guide for the index finger. The guide is directed parallel to the direction of the picture taking lens to guide and support the index finger toward the subject to be photographed.

The grip thus takes advantage of the fact that there is significantly enhanced hand-to-eye coordination between a direction or object toward which the eyes are looking, and the direction or object at which the index finger is pointing. In the case of this camera hand grip, the operator looks at the object he wants to photograph, and points his index finger at the thing he is viewing. By this device, therefore, the operator can aim the camera even if he is holding it at waist level. The hand grip is particularly suitable and desirable for candid picture taking, such as close-ups and semi-close-ups at social gatherings and the like.

The hand grip incorporates a shutter actuator button. This is in the form of a flexible cable of the kind that can be conventionally connected to a camera. In this hand grip, the cable is actuated by a depressible element located at the thumb position of the hand grip. The depressible element is oriented so that it is actuated with a downward motion of the distal phalanx bone of the thumb, thereby minimizing any influence on the muscles that control the direction toward which the index finger is pointing.

BRIEF DESCRIPTION OF THE DRAWING

FIG. 1 is a top plan view of the hand grip;

FIG. 2 is a right side elevation view of the hand grip;

FIG. 3 is a left side elevation view of the hand grip;

FIG. 4 is an enlarged fragmentary view in section taken along the line 4—4 of FIG. 1;

FIG. 5 is a fragmentary view in section taken along the line 5—5 of FIG. 4;

FIG. 6 is a schematic right elevation view showing an operator holding the hand grip, and showing the hand grip connected to a camera;

FIG. 7 is a left side elevation view of the hand grip, camera and operator's hand.

DETAILED DESCRIPTION OF THE INVENTION

This hand grip 10 comprises a gripper section 11 formed similar to a pistol grip so that it may be gripped by the palm and lower fingers of the hand H. The grip 10 illustrated is for a right hand. There is an inwardly curved section 12 for receiving and positioning the upper portion of the palm between the index finger and thumb. Another hand positioner comprises an enlarged butt at the lower end of the gripper section 11. The lower portion of the hand is positioned against the butt 13. As another hand positioner, the gripper section 11 may include a notch 14 at its front for positioning the middle finger of the hand which holds the hand grip.

Extending forwardly and above the gripper section 11, the camera hand grip 10 is divided into two sides 15 and 16. Partially below the upper edges of the sides 15 and 16, there is a shelf 17 formed between the sides 15 and 16. There are wall portions 18, 19, and 20 on three sides of the shelf 17. These wall sections 18, 19, and 20, may be varied in shape and size, and the spacing between the sides 15 and 16 may be varied as determined by the size or kind of camera C that is to be mounted with the camera hand grip 10. For this mounting, the shelf 17 has a counter sunk hole 21 to it (see FIG. 4) through which a set screw 22 may extend for threading into an appropriate recess that is conventionally present in commercial cameras, such as the camera C.

An important feature of this invention is the fact that the side 16 of the grip 10 has a forwardly directed index finger rest 23 against which the index finger of the hand bears when the hand is holding the hand grip 10 (see FIG. 6). The index finger rest 23 has a slight longitudinal concavity 24 within which the index finger is received and supported, as the index finger is intended to be directed in the line of the index finger rest 23 with the rest 23 acting primarily as a guide. The index finger rest 23 extends in the direction the picture taking lens L of the camera C is aimed (see FIGS. 6 and 7).

The other side 15 of the camera hand grip 10 has a recessed section 25 that is curved to receive and cradle the thumb of the hand H. As shown in FIG. 5, a depressible operating button 26 of a flexible shutter release cable 27 extends through an appropriate opening 28 in the side 15 and is held in place by a suitable ferrule 29 affixed to the cable 27 and locked in place by a set screw 30. The cable 27 is connected to the camera C as is conventional for such cables. The button 26 is positioned for operation by the thumb of the hand H holding the camera C. Furthermore, according to this invention, the button 26 is oriented for actuation by generally downward pressure, enabling actuation by a downward motion of the distal phalanx bone of the thumb while the hand H grips the handle 11 and the index finger is guided by the guide 23. This orientation minimizes any influence on the muscles which hold the index finger pointing steadily at the object to be photographed.

OPERATION AND USE

The camera hand grip 10 is prepared for use by connecting it to a camera C by use of the bolt 22. Alternatively, the hand grip 10 may be formed as an integral part of the body of the camera, but is otherwise a conventional camera like the camera C. Preferably, the camera C is a very inexpensive construction that is designed primarily for taking candid photographs from distances within the range of 3 to 15 feet, although other designs for the camera C may be incorporated.

To use the hand grip 10 with the camera C attached, the grip 11 is gripped as illustrated in FIGS. 6 and 7 with the lower three fingers and the thumb surrounding the gripper sectional 11 as positioned by the guides 12, 13, and 14, and with the index finger resting against the index finger rest 23 and the thumb extending within the thumb locater 16.

When it is desired to take a picture, the index finger is simply pointed at an object or at a person or a portion of a person toward which the operator is looking. The camera need not be sighted at the eye or through any viewing lens as is conventional because the hand-to-eye coordination correlating the pointing of an index finger to the direction of eye viewing is very accurate. Finally, the operator depresses the button 26 and the shutter release cable 27 does its conventional job of releasing the shutter of the camera C.

Thus, this invention enables the operator to take candid photographs without interrupting his other activities and without drawing attention of the subject to the fact that the photograph is being taken. The orientation of the shutter release permits the shutter release to be actuated without jerking the index finger and therefore without jerking the camera C.

Various changes and modifications may be made within the purview of this invention as will be readily apparent to those skilled in the art. Such changes and modifications are within the scope and teaching of this invention as defined by the claims appended hereto.

What is claimed is:

1. A hand grip for supporting a camera comprising a grip by which the hand of an operator may hold the camera, an index finger guide incorporated in the grip, the index finger guide being directed in the same direction as a picture taking lens of the camera, the index finger guide being elongated to guide the index finger in a fully extended position and having a longitudinal recess for receiving the index finger of the hand for pointing toward the subject to be photographed during operation of the camera shutter, a thumb positioner incorporated in the hand grip, and a depressible shutter release supported by the grip for actuation by the thumb of the hand holding the grip, said shutter release being oriented for actuation by downward pressure of the thumb.

2. The camera hand grip of claim 1 in which said depressible shutter release is a plunger type member mounted on the hand grip at the thumb positioner for substantially vertical position in respect to the horizontal line of sight of a camera supported by said hand grip.

3. The camera hand grip of claim 2 in which said plunger type member is depressible by thumb pressure exerted towards the hand grip and at substantially right angles to the gripping fingers of the hand.

* * * * *